(12) United States Patent
Sarlioglu et al.

(10) Patent No.: US 7,495,404 B2
(45) Date of Patent: Feb. 24, 2009

(54) POWER FACTOR CONTROL FOR FLOATING FRAME CONTROLLER FOR SENSORLESS CONTROL OF SYNCHRONOUS MACHINES

(75) Inventors: Bulent Sarlioglu, Torrance, CA (US); Colin E. Huggett, Longmont, CO (US)

(73) Assignee: Honeywell International Inc., Morristown, NJ (US)

( * ) Notice: Subject to any disclaimer, the term of this patent is extended or adjusted under 35 U.S.C. 154(b) by 351 days.

(21) Appl. No.: 11/205,065

(22) Filed: Aug. 17, 2005

(65) Prior Publication Data

US 2007/0040524 A1  Feb. 22, 2007

(51) Int. Cl.
*H02P 23/00* (2006.01)

(52) U.S. Cl. .................. 318/438; 318/717; 318/700; 318/716

(58) Field of Classification Search .................. 318/438, 318/721, 700, 808, 812, 717, 716
See application file for complete search history.

(56) References Cited

U.S. PATENT DOCUMENTS

| | | | |
|---|---|---|---|
| 5,363,032 A | 11/1994 | Hanson et al. | |
| 5,428,283 A | 6/1995 | Kalman et al. | |
| 5,920,161 A | 7/1999 | Obara et al. | |
| 6,081,093 A | 6/2000 | Oguro et al. | |
| 6,301,136 B1 | 10/2001 | Huggett et al. | |
| 6,349,724 B1 * | 2/2002 | Burton et al. | 128/204.18 |
| 6,367,474 B1 * | 4/2002 | Berthon-Jones et al. | 128/204.23 |
| 6,401,713 B1 * | 6/2002 | Hill et al. | 128/204.21 |
| 6,567,282 B1 | 5/2003 | Kikuchi et al. | |
| 6,644,310 B1 * | 11/2003 | Delache et al. | 128/204.21 |
| 6,720,753 B2 | 4/2004 | Kikuchi et al. | |
| 2002/0114536 A1 * | 8/2002 | Xiong et al. | 382/284 |
| 2003/0080701 A1 | 5/2003 | Kikuchi et al. | |
| 2003/0081434 A1 | 5/2003 | Kikuchi et al. | |
| 2004/0007995 A1 * | 1/2004 | Fu | 318/254 |
| 2004/0021447 A1 | 2/2004 | Kalman et al. | |
| 2004/0056487 A1 | 3/2004 | Sarlioglu et al. | |
| 2005/0063205 A1 * | 3/2005 | Stancu et al. | 363/132 |

FOREIGN PATENT DOCUMENTS

WO  WO 2005/099076 A2  10/2005

OTHER PUBLICATIONS

European search report dated Feb. 2, 2008.

* cited by examiner

*Primary Examiner*—Bentsu Ro
*Assistant Examiner*—David S Luo
(74) *Attorney, Agent, or Firm*—Oral Caglar, Esq.

(57) ABSTRACT

A system and method of controlling the power factor for providing either unity, leading or lagging results for the sensorless control of synchronous machines. The system and method provides an estimated angle of the phase current Park vector and uses a floating synchronous reference frame that is shifted from the estimated angle of the phase current Park vector by an angle β to allow the active control and change of the power factor during operation for applications such as producing reluctance torque of a salient pole synchronous machine during Main Engine Start (MES), and field weakening for Environmental Control Systems (ECS) and MES applications.

20 Claims, 6 Drawing Sheets

CONTROLLER MODEL IN
FLOATING FRAME CONTROLLER

FIG. 1
(Prior Art)

CONTROLLER MODEL IN
FLOATING FRAME CONTROLLER

FIG. 6 ably POWER FACTOR CONTROL FOR FLOATING
FRAME CONTROLLER FOR SENSORLESS
CONTROL OF SYNCHRONOUS MACHINES

CROSS-REFERENCE TO RELATED
APPLICATIONS

Related subject matter is disclosed in U.S. Pat. No. 6,301,136, issued on Oct. 9, 2001, entitled "Floating Frame Controller", in U.S. patent application Ser. No. 10/834,857 entitled "Decoupling Of Cross Coupling For Floating Reference Frame Controllers For Sensorless Control Of Synchronous Machines", filed Apr. 30, 2004, and in U.S. patent application Ser. No. 11/174,550 entitled "Enhanced Floating Reference Frame Controller For Sensorless Control Of Synchronous Machines", filed Jul. 6, 2005, wherein the entire contents of each are incorporated herein by reference.

FIELD OF THE INVENTION

The present invention relates to a power factor (PF) controller for the sensorless control of synchronous machines. More particularly, the present invention relates to a system and method for the active control of power factor needed for various applications, such as achieving field weakening of Permanent Magnet (PM) synchronous machines or reluctance torque generation of salient pole synchronous starter/generators for Turbine Engine Start systems such as auxiliary power units and main engines.

BACKGROUND OF THE INVENTION

A conventional synchronous motor typically uses rotor position sensors to provide information regarding the position of the motor's rotor with respect to the motor's stator windings. Rotor position sensors, such as Hall effect devices, are typically mounted in the stator, proximate to the stator windings. The rotor position sensors provide rotor position information which allows for the proper control for the conversion of power that is supplied to the stator windings of an electrical machine.

However, rotor position sensors can be unreliable due to mechanical alignment problems (e.g., problems caused by bearings) and temperature incompatibility problems between the stator windings and the electronic components, such as the incorporated Hall effect devices. Moreover, the rotor position sensors can be difficult to mount to the motor during motor assembly, especially for multi-pole motors. In such multi-pole motor assemblies, the electrical misalignment angle is equivalent to the angular mechanical misalignment angle multiplied by the number of pairs of poles. In response to these and other problems with rotor sensors, several sensorless position control techniques have been developed for controlling the speed of the synchronous machines.

Figure 1:
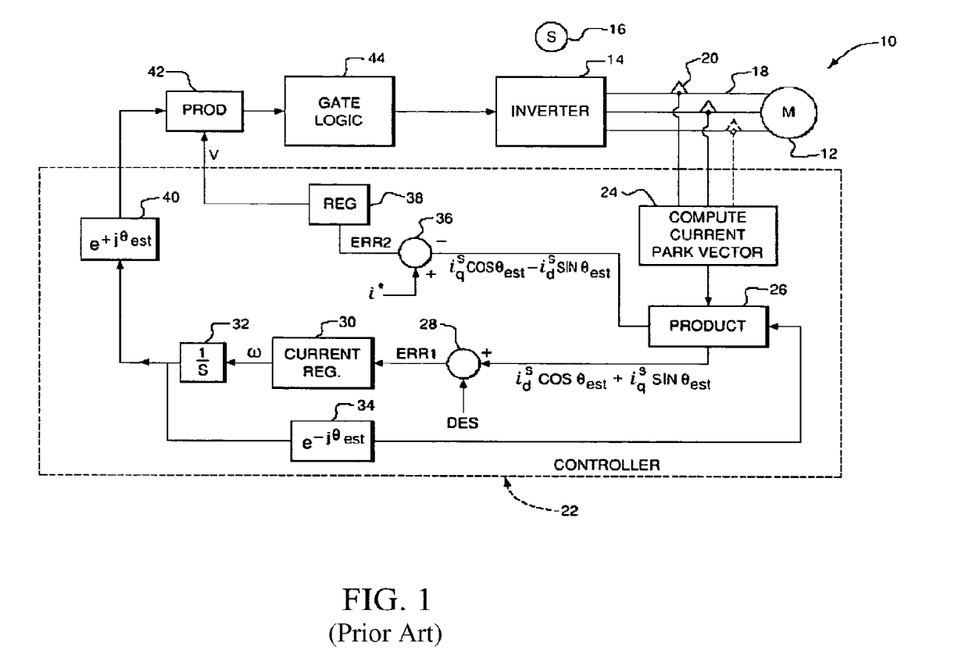
FIG. 1 is a high level block diagram illustrating a controller model in a floating frame controller.

For example, U.S. Pat. No. 6,301,136 to Huggett et al., which is incorporated herein by reference in its entirety, discloses a floating reference frame controller which advantageously provides a floating synchronous reference frame for controlling an inverter to drive a synchronous motor. FIG. 1 is a high level block diagram which is provided to illustrate such a controller model in a floating frame controller. Specifically, FIG. 1 illustrates a synchronous machine drive system 10 including a three-phase synchronous machine 12, and an inverter 14 to be coupled to a power source for supplying dc power to the inverter 14. During operation of the synchronous machine 12, the inverter 14 converts the dc power to three-phase ac power and supplies currents to all three stator windings of the machine 12. These currents flow through the windings and create a rotating magnetic field.

The system 10 estimates the reference frame without using position sensors, and further includes a set of current sensors 20 for sensing current on the power line and a floating frame controller 22 for controlling the inverter 14 to convert the dc power to suitable three-phase ac power. Each current sensor 20 is synchronously and periodically sampled. Thus, a set of current samples (i.sub.a, i.sub.b, i.sub.c) is periodically produced.

However, due to the coupling impact of the motor circuitry in the floating synchronous reference frame, delays exist during transients, during which, the estimated angle of the current Park vector differs from the actual angle of the current Park vector. Also, the coupling impact of the motor equivalent circuit in the floating synchronous reference frame forces the gain of the regulator used for angle estimation to be kept small, which slows the system response.

A further result of using a small gain is a significant delay in reducing the error between the estimated angle of the current Park vector and the actual angle of the current Park vector during slow transients, such as acceleration and deceleration, as well as fast transients, such as step changes. Because undesirable imaginary axis current flows in the machine during these delays, longer delays may require substantial overrating of the inverter and electrical machine. Ideally, only real-axis current in floating reference frame flows in the machine, as the floating synchronous reference frame is aligned with the real axis component of the current Park vector.

In prior schemes for sensorless control, the current vector is either in-phase with the terminal voltage vector as illustrated by the disclosure of U.S. Pat. No. 6,301,136 referenced above, or not in-phase in an uncontrolled fashion due to the application of the decoupling of crosscoupling concept as illustrated by the disclosure of U.S. patent application Ser. No. 10/834,857 referenced above. However, in some applications, it is desirable to control or actively change the power factor during the operation to achieve desired system characteristics and requirements.

In yet another scheme for sensorless control, the power factor control is achieved using both ac and dc current sensors as illustrated by the disclosure of U.S. patent application Ser. No. 11/174,550 referenced above. In this method, at least two motor phase currents are measured and a floating reference frame for the current Park vector is obtained. The reference frame is adjusted based on an estimated rotor speed, and the power converter is controlled via the floating reference frame. However, this method requires both ac and dc current sensors.

Accordingly, there is a need to achieve power factor control providing unity, leading or lagging results, for the sensorless control of synchronous machines, whereby the cost, size, and volume can be minimized and reliability can be increased.

SUMMARY OF THE INVENTION

The above disadvantages are avoided and other advantages are realized in embodiments of the present invention wherein, according to one object of the present invention, a system and method is provided to process at least one Park vector in floating reference frame to produce an angular estimation of a current vector.

According to another object of the present invention, a system and method is provided to add an angle command of a current Park vector in floating reference frame to the negative of an estimated angular velocity signal.

These and other objects are substantially achieved by providing a system and method for controlling the power factor at either unity, leading or lagging, for the sensorless control of synchronous machines. The system and method commands a desired power factor (PF), either leading, lagging or unity, using a positive, negative, or unity value, respectively, and compares the desired power factor with the actual power factor feedback ((PF)fdbk) at a first adder, wherein the comparison produces a first error value. The system further operates upon the first error value with a Proportional Integrator (PI) regulator, wherein an output of the regulator is an angle command of the current Park vector in floating reference frame provided to a floating frame controller. The system and method allows the active control and change of the power factor during operation for applications such as producing the reluctance torque of a salient pole synchronous machine during Main Engine or Auxiliary Power Unit (APU) start, and field weakening of a PM machine for Environmental Control Systems (ECS) and Main Engine or APU start applications.

BRIEF DESCRIPTION OF THE DRAWINGS

The invention will be more readily understood with reference to the exemplary embodiments illustrated in the attached drawing figures, in which.

In the drawing figures, it will be understood that like numerals refer to like features and structures.

DETAILED DESCRIPTION OF THE EXEMPLARY EMBODIMENTS

In the exemplary embodiments of the present invention described below, a power factor controller is provided for a sensorless control technique for synchronous machines by using a floating frame controller. There are various definitions of power factor depending upon the characteristics of the electrical circuit. In sinusoidal electrical systems, power factor can be defined as the angle between the terminal voltage and phase current phasors or vectors. In nonlinear systems where the applied voltage is sinusoidal, power factor can be defined as the ratio of the fundamental phase current to the RMS current.

As noted above, in prior techniques for sensorless control, the current vector is typically either in-phase with the terminal voltage vector, or not in-phase in an uncontrolled fashion due to the introduction of the decoupling of crosscoupling concept. Therefore, the power factor is unity or changes in an uncontrolled fashion due to the decoupling of crosscoupling. In some applications, it is desirable to operate with a constant power factor or alternatively, actively change the power factor during the operation to achieve other desired system characteristics and requirements. To achieve this, embodiments of the present invention are provided to control the power factor for providing unity, leading or lagging results.

In a first application example described in greater detail below, an embodiment of the present invention can be used to produce the reluctance torque of a salient pole synchronous machine or an internal PM synchronous machine, wherein the current space vector is preferably lagging the q-axis. In a second application example described in greater detail below, an embodiment of the present invention can be used to achieve field weakening for surface mounted synchronous PM machines for ECS applications and salient pole synchronous machines (Starter/Generator) or internal PM machines for Main Engine Start, wherein the current space vector is preferably leading the q-axis. The power factor control systems and methods for sensorless drives described below can achieve these and other system level requirements with robust sensorless control and performance.

In the embodiments of the present invention described below, the sensorless systems and methods are categorized into two groups based on the relationship of electrical angle of the current and terminal voltage Park vectors. A first category includes the original floating frame controller (FFC). In this controller, the Park vector of the phase current is in-phase with the Park vector of the terminal voltage at steady state. This can be considered an optimized solution for some drive applications from the perspective of inverter sizing.

A second category includes the FFC with decoupling of crosscoupling terms. This controller improves the transients and system response by achieving a higher accuracy in the estimation by using higher gains. However, this system and method introduces a u-axis voltage, which depends upon the inductance of the motor, the speed, and the v-axis current. At steady state, there exists a significant voltage for the u-axis and, therefore, the Park vector of the phase current is no longer in-phase with the terminal voltage.

Figure 2:
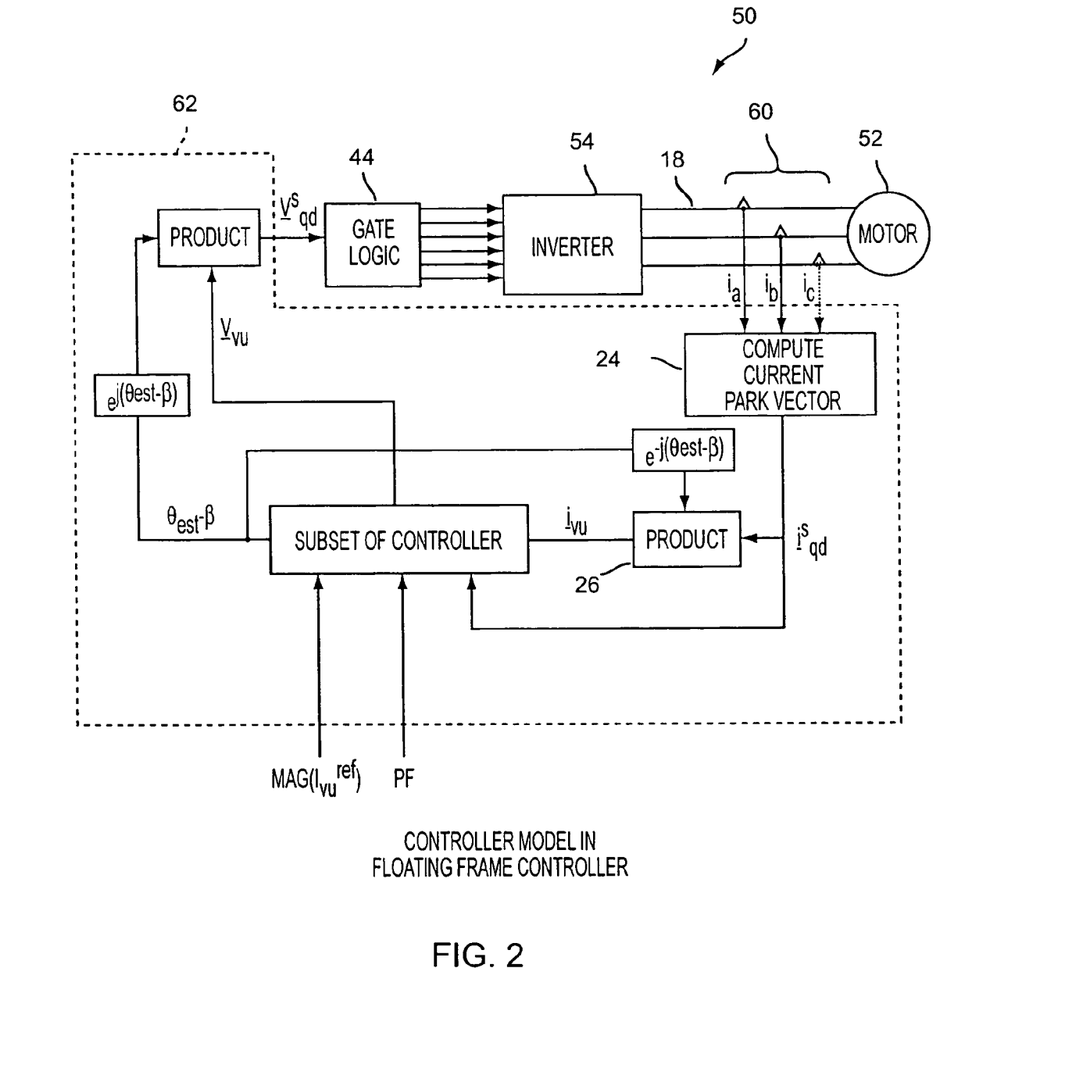
FIG. 2 is a high level block diagram illustrating a controller model in a floating frame controller wherein the floating reference frame is shifted.
Figure 3:
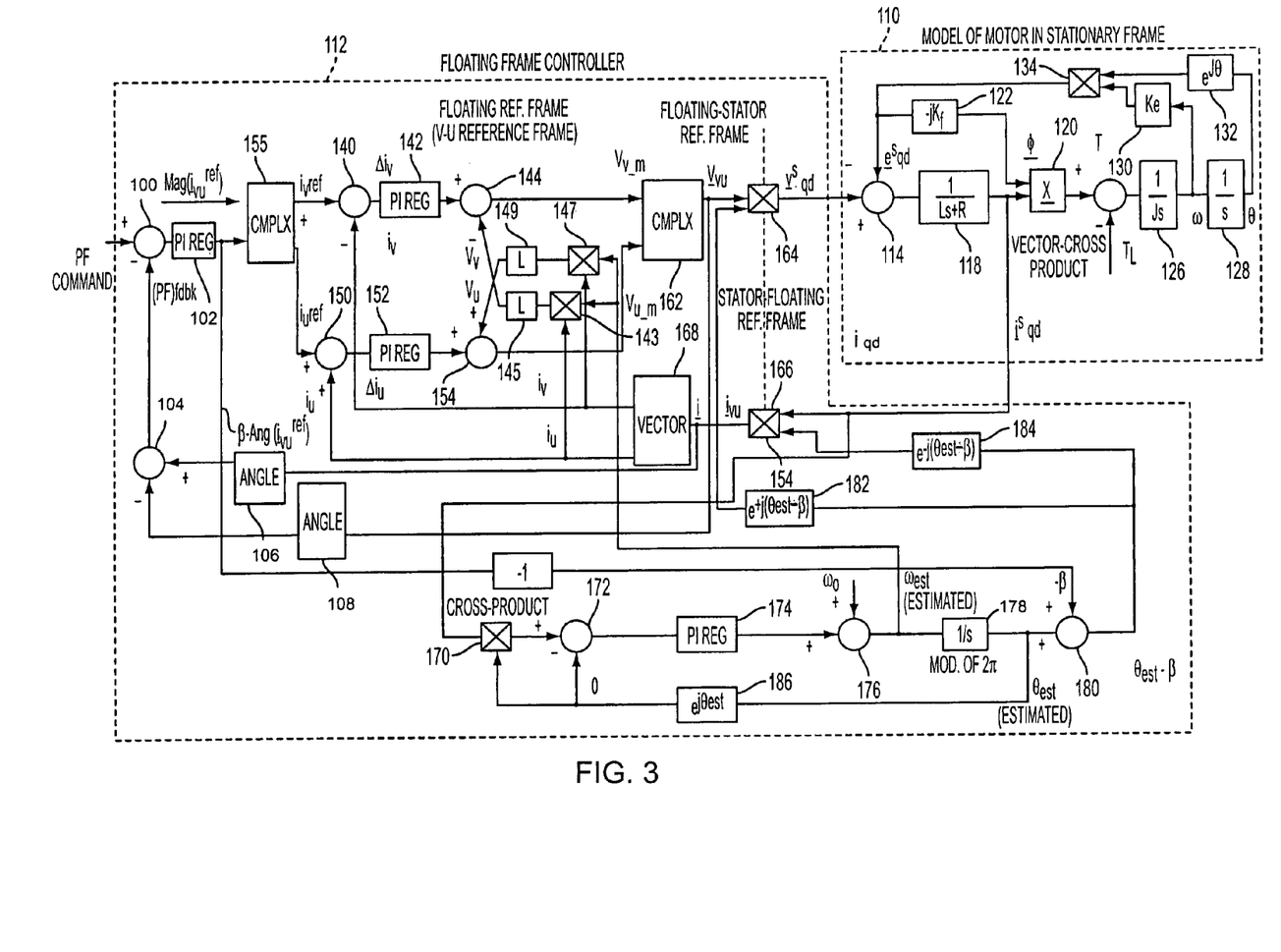
FIG. 3 is a block diagram illustrating a control example for power factor control for a sensorless controller in accordance with an embodiment of the present invention.

Power factor control is often required to achieve unity power factor with the decoupling of crosscoupling concept to utilize reluctance torque of machines where reluctance torque is available, and to further achieve field weakening in other applications. One method to achieve this goal is providing a floating synchronous reference frame that is shifted. FIG. 2 is a high level block diagram illustrating a controller model in a floating frame controller wherein the floating reference frame is shifted. FIG. 2 illustrates a synchronous machine drive system 50 including a three-phase synchronous machine 52, and an inverter 54 to be coupled to a power source for supplying dc power to the inverter 54. During operation of the synchronous machine 52, the inverter 54 converts the dc power to three-phase ac power and supplies currents to all three stator windings of the machine 52. These currents flow through the windings and create a rotating magnetic field. The system 50 estimates the reference frame without using position sensors, and further includes a set of current sensors 60 for sensing current on the power line and a floating frame controller 62 for controlling the inverter 54 to convert the dc power to suitable three-phase ac power. Each current sensor 60 is synchronously and periodically sampled. Thus, a set of current samples (i.sub.a, i.sub.b, i.sub.c) is periodically produced. However, in the system 50 of FIG. 2, the floating synchronous reference frame is shifted by an angle β. To achieve this, a system and method for power factor control in accordance with an embodiment of the present invention is shown in FIG. 3. The current Park vector position and angular speed estimation process of FIG. 3 is carried out by the system and method shown in greater detail in FIG. 4, and the shift from the estimated angle of the phase current Park vector by an angle β is shown in FIG. 5 as performed by blocks 182 and 184 of FIG. 3.

FIG. 3 is a block diagram illustrating an example of power factor control for a sensorless controller in accordance with an embodiment of the present invention. The block diagram of FIG. 3 includes a desired power factor input command input to a floating frame controller 112 coupled to a motor model 110. The desired power factor input command is input to the floating frame controller 112 via a PI regulator 102. The floating frame controller 112 then provides an output to a motor model in stationary frame 110. As shown in FIG. 2, the desired power factor (either unity, leading or lagging created using a unity, positive or negative values) is commanded as the input PF, and compared with the actual power factor feedback ((PF)fdbk) at adder 100. The error is operated upon by the PI regulator 102, and the output of the regulator 102 is the angle command of the current Park vector in floating reference frame provided to the floating frame controller 112 and the motor model 110.

The commanded current Park vector is decomposed into v- and u-components, and compared with the corresponding feedback in floating reference frame as described in greater detail below. Each current error is operated upon by a PI regulator 142 and 152, respectively, and the output of each PI regulator is a voltage value, which is then summed with the decoupling of crosscoupling terms for accurate estimation by adders 144 and 154.

The resultant values are the v- and u-component of the commanded Park vector of the voltage in floating reference frame. This quantity is transferred into the stationary reference frame using the $e^{+j(\theta_{est}-\beta)}$ term. A pulse width modulation scheme, such as space vector control scheme, can then be used to apply the three phase voltages by using the commanded Park vector of the voltage in stationary reference frame.

In an exemplary embodiment of the system and method of the present invention described below, only two or three phase currents of the machine are used to determine the rotation speed and position information of the current Park vector. It can be assumed for the example below, that an inverter is used to supply the three phase voltages to the synchronous generator using space vector modulation. The Park vector, also called the space vector of the phase current in stationary reference frame, is obtained by using equation (1) below, $$i_{qd}^s = \tfrac{2}{3}(i_a + ai_b + a^2 i_c) = i_q^s - ji_d^s \qquad (1)$$

wherein the complex constants a and $a^2$ in this example are provided as the following values:

$$a = e^{j2\pi/3} = -0.5 + j0.866$$

$$a^2 = e^{j4\pi/3} = -0.5 - j0.866$$

The d-q components in this example, therefore, are defined as, $$i_{qd}^s = i_q^s - ji_d^s = \tfrac{2}{3}[(i_a - 0.5(i_b + i_c)) + j0.866(i_b - i_c)]$$

resulting in equations (2) and (3) below.

$$i_q^s = \tfrac{2}{3}(i_a - 0.5(i_b + i_c)) \qquad (2)$$

$$i_d^s = \tfrac{2}{3}(0.866(i_c - i_b)) \qquad (3)$$

Figure 4:
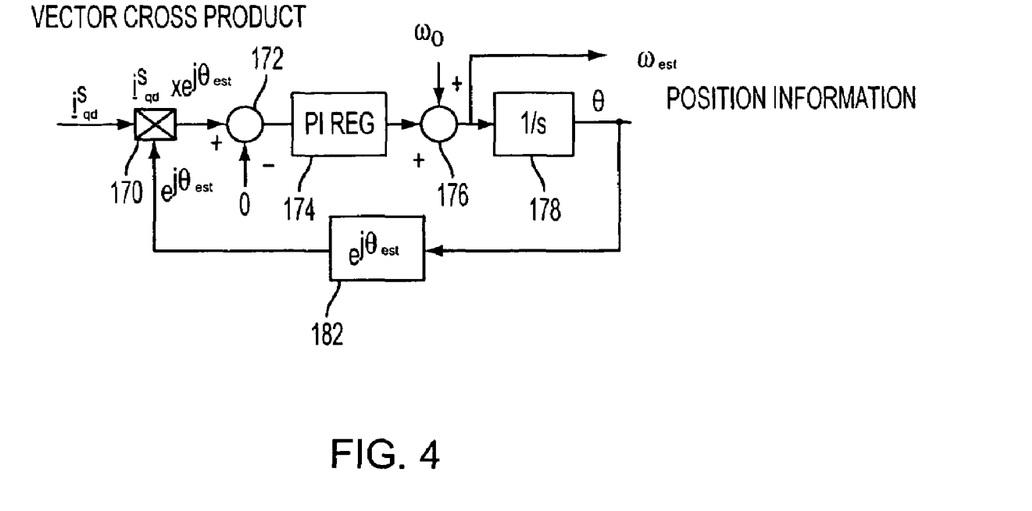
FIG. 4 is a detailed block diagram illustrating a control example for the estimation of current Park vector position and angular speed in accordance with an embodiment of the present invention.
Figure 5:
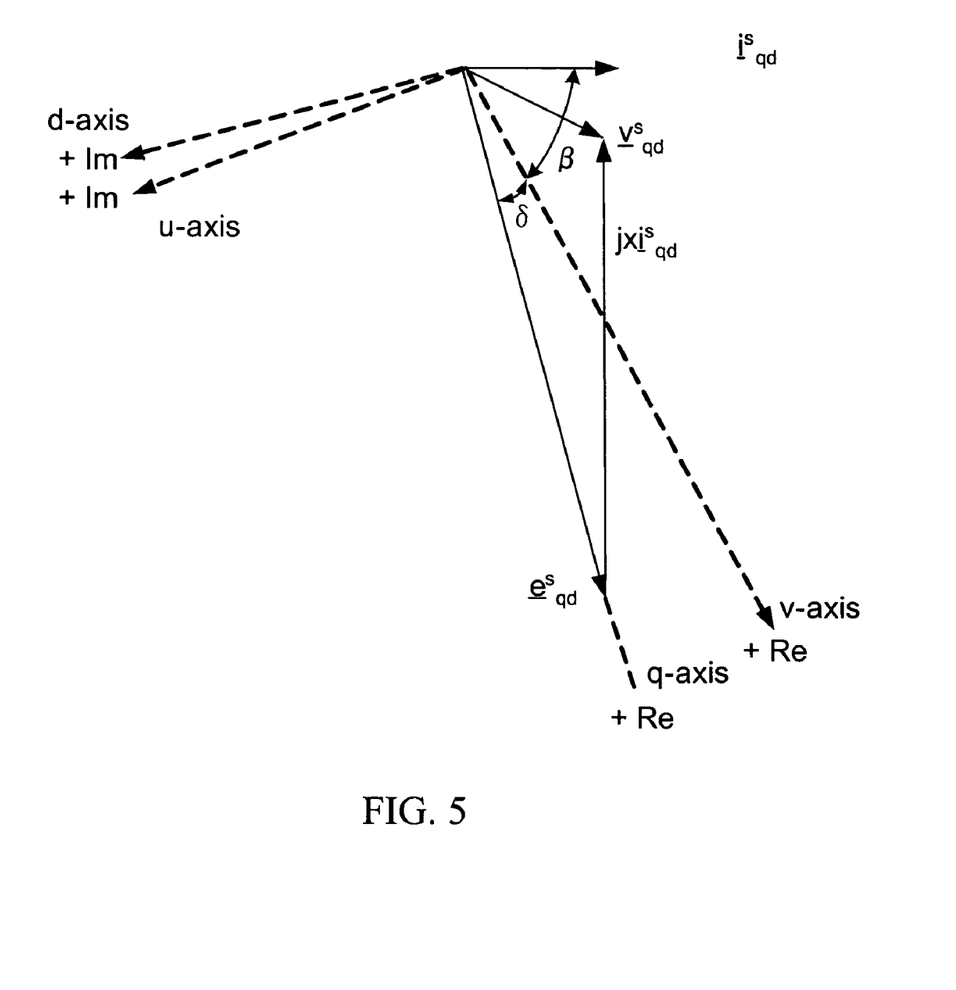
FIG. 5 is a vector diagram illustrating the floating reference frame axes wherein the floating reference frame is shifted in accordance with an embodiment of the present invention.

As shown in greater detail in FIG. 4, the Park vector of the phase current $i_{qd}^s$ in stationary reference frame is vector-crossmultiplied by $e^{j\theta_{est}}$ at multiplier 170 and compared with a zero value at adder 172. FIG. 4 is a detailed block diagram illustrating a control example for the estimation of current Park vector angular position and speed in accordance with an embodiment of the present invention. The error between the product of ($i_{qd}^s \times e^{j\theta_{est}}$) and the zero value of FIG. 4 is then fed into a PI regulator 174. The output of the PI regulator 174 is the angular speed estimation of the current vector. Finally, the angular position estimation is obtained by integrating the angular speed at block 178, and this position information can then be used for the coordinate transformations for the controller of FIG. 3. FIG. 3 illustrates an implementation and visualization of the cross-product in accordance with an embodiment of the present invention.

In the embodiments of the present invention, the estimated angular position $\theta_{est}$ is added to the negative of the angle β of the current Park vector in floating reference frame. Park vectors inherently contain information on both the instantaneous magnitudes and the phase relationship of three phase rotating fields with respect to a reference coordinate system. A Park vector, in general, is a mathematical representation that describes the locus of an electrical quantity in the complex space domain where time is a parameter. A current Park vector is defined with the vector's amplitude and the vector's direction in spatial relation to the three phases. A general discussion of Park vectors is provided in P. K. Kovacs, "Transient Phenomena in Electrical Machines," Elsevier Science Publishing Co. (1984), the relevant text of which is incorporated herein by reference.

The v-u axis of FIG. 5 represents the floating synchronous reference frame that is shifted from the estimated angle of the phase current Park vector by angle β. FIG. 5 is a vector diagram illustrating the floating reference frame axes (v-u) with respect to the stationary reference frame axes (q-d). Based on the relationship between the two sets of axis, the following transformation equation sets (4), (5), (6) and (7) are derived:

$$\underline{i}_{vu} = i_v - ji_u \text{(Current Vector in Floating Synchronous Reference Frame)}$$

$$\underline{i}_{qd} = i_q - ji_d \text{(Current Vector in Stationary Reference Frame)} \qquad (4)$$

Current Transformation Equations $$\underline{i}_{qd}^s = \underline{i}_{vu} e^{j(\theta_{est}-\beta)} \text{ or } \underline{i}_{vu} = \underline{i}_{qd}^s e^{-j(\theta_{est}-\beta)}$$

$$i_v = -i_d^s \sin(\theta_{est}-\beta) + i_q^s \cos(\theta_{est}-\beta)$$

$$i_u = i_d^s \cos(\theta_{est}-\beta) + i_q^s \sin(\theta_{est}-\beta)$$

$$i_q^s = i_u \sin(\theta_{est}-\beta) + i_v \cos(\theta_{est}-\beta)$$

$$i_d^s = i_u \cos(\theta_{est}-\beta) - i_v \sin(\theta_{est}-\beta) \qquad (5)$$

$$\underline{v}_{vu} = v_v - jv_u \text{(Current Vector in Floating Synchronous Reference Frame)}$$

$$\underline{v}_{qd} = v_q - jv_d \text{(Current Vector in Stationary Reference Frame)} \qquad (6)$$

Voltage Transformation Equations $$\underline{v}_{qd}^s = \underline{v}_{vu} e^{j(\theta_{est}-\beta)} \text{ or } \underline{v}_{vu} = \underline{v}_{qd}^s e^{-j(\theta_{est}-\beta)}$$

$$v_v = -v_d^s \sin(\theta_{est}-\beta) + v_q^s \cos(\theta_{est}-\beta)$$

$$v_u = v_d^s \cos(\theta_{est}-\beta) + v_q^s \sin(\theta_{est}-\beta)$$

$v^s_q = v_u \sin(\theta_{est} - \beta) + v_v \cos(\theta_{est} - \beta)$ $v^s_d = v_u \cos(\theta_{est} - \beta) - v_v \sin(\theta_{est} - \beta)$ (7)

Figure 6:
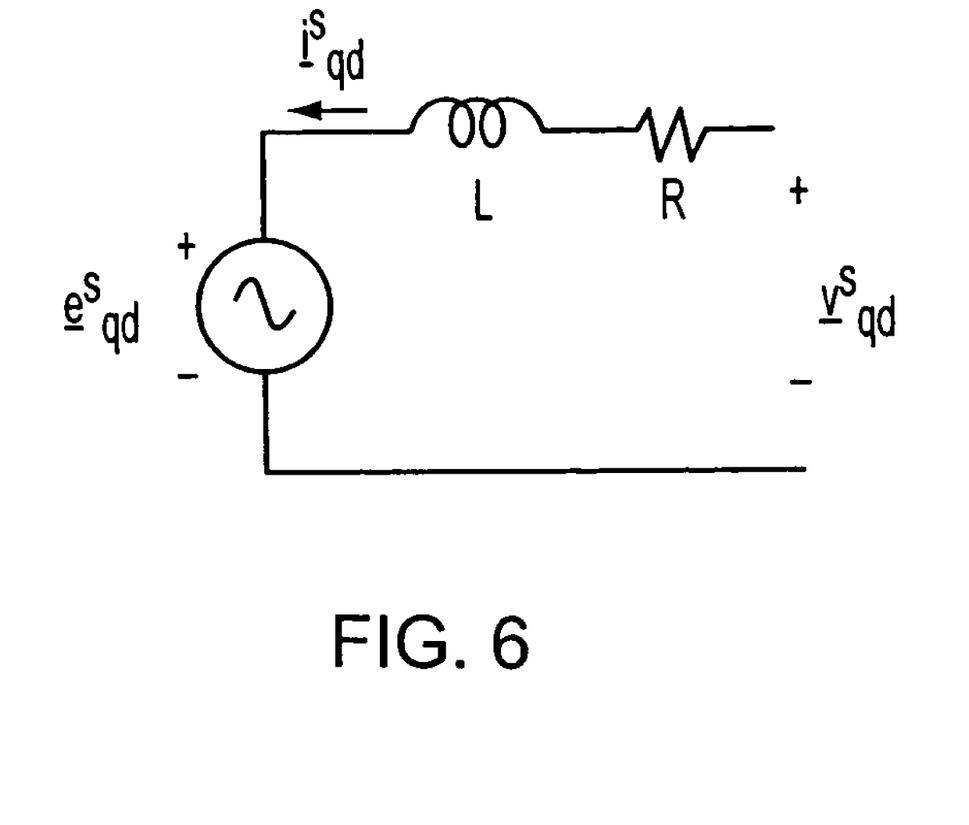
FIG. 6 is an equivalent circuit for a PM motor in accordance with an embodiment of the present invention.

For purposes of illustration, it can be assumed that a surface mounted PM synchronous machine is represented by phase resistance R, synchronous inductance L, and back emf $\underline{e}^s_{qd}$ in the stationary reference frame, as shown in FIG. 6. Thus, the voltage transformation equation (6) can be rewritten as the following equation (8), $\underline{v}^s_{qd} = \underline{e}^s_{qd} + L\, d\underline{i}^s_{qd}/dt + \underline{i}^s_{qd} R$ (8)

wherein $\underline{v}^s_{qd}$ is the Park vector of the inverter voltage, $\underline{e}^s_{qd}$ is the Park vector of the back emf, and $\underline{i}^s_{qd}$ is the Park vector of the phase current, all in stationary reference frame. The value L is the synchronous inductance, and R is the phase resistance of the synchronous machine.

Returning to FIG. 3, the block diagram illustrates a controller model and machine model according to an embodiment of the present invention in Park vector format. Controller 112 controls and regulates the machine current Park vector by generating a voltage Park vector $\underline{v}^s_{qd}$ which is coupled to a machine model 110. Machine model 110, which is represented in stationary reference frame, receives and utilizes the voltage command. Adder 114 of the machine model 110 receives the voltage Park vector $\underline{v}^s_{qd}$ and compares it to a back-emf $\underline{e}^s_{qd}$ Park vector of the machine, wherein both values are in stationary reference frame. The resultant signal drives a current Park vector in stationary reference frame through the stator windings according to the function [1/(Ls+R)] of block 118. The output of block 118 is received by vector product block 120. Block 120 also receives a flux Park vector in stationary reference frame $\underline{\phi}$ generated by the back-emf Park vector multiplied by the $(-jK_f)$ function of block 122.

The output of vector product block 120 is electrical torque T produced by the machine, and is subtracted from the load torque $T_L$ at adder 130. The output of adder 130 is operated upon by the function [1/Js] of block 126 which outputs the angular velocity signal $\omega$ (wherein J is inertia). The angular velocity signal $\omega$ is operated upon by the integral function [1/s] of block 128 and $K_e$ of block 130. The output of the integral function [1/s] of block 128 is an angular position signal $\theta$. The angular position signal $\theta$ is then received by block 132, which multiplies the angular position signal $\theta$ by $e^{j\theta}$. The outputs of block 132 and block 130 are then received by multiplication block 134, which generates the back emf Park vector $\underline{e}^s_{qd}$ in stationary reference frame.

The floating synchronous frame controller 112 will now be described in greater detail with reference to FIG. 3. In the floating synchronous reference frame, current signal Mag $(i_{vu}^{ref})$ is input with an angle command to the Complex block 155. The reference $i_v^{ref}$ is then generated by the Complex block 155 and is received by adder 140 and compared to the measured v-axis current $i_v$. Current error signal $\Delta i_v$ is output from adder 140 to PI Regulator 142. Similarly, the floating synchronous reference frame current reference $i_u^{ref}$ is also generated by the Complex block 155 and is received by adder 150 and compared to the measured u-axis current $i_u$. Current error signal $\Delta i_u$ is then output from adder 150 to PI Regulator 152.

The decoupling feature of the floating synchronous frame controller 112, which is described in U.S. patent application Ser. No. 10/834,857 referenced above, will now be described in greater detail with reference to FIG. 3. The v-axis current command $i_v^{ref}$ is received at adder 140 and is compared to the actual v-axis current $i_v$ to generate a current error signal $\Delta i_v$, all in floating synchronous reference frame. The $\Delta i_v$ is operated upon by PI regulator 142 to generate a voltage command signal $v_v$. The v-axis voltage command is decoupled at adder 144, which adds the output of multiplication block 143 and inductance block 145 to the voltage command signal $v_v$ to generate the decoupled voltage command signal $v_{v\_m}$ which is input to Complex block 162. Multiplication block 143 multiplies the current $i_u$ with the estimated rotor angular speed signal $\omega_{est}$. The output of multiplication block 143 is then received by inductance block 145 to generate the decoupling command term $j\omega_{est} L i_u$ that is then provided to adder 144.

Similarly for the u-axis, multiplication block 147 multiplies the v-axis current $i_v$ with the estimated rotor angular speed signal $\omega_{est}$. The output of multiplication block 147 is then received by inductance block 149 which generates a decoupling command term $+j\omega_{est} L i_v$ that is then provided to the adder 154. The output of the adder 154 is the generated voltage command $v_{u\_m}$ for the u-axis which is also input to Complex block 162.

The decoupled v-axis and u-axis voltage terms $v_{v\_m}$ and $v_{u\_m}$ are received by Complex block 162 to generate a floating synchronous reference frame voltage Park vector command. The floating reference frame voltage Park vector command is then multiplied by $e^{+j(\theta_{est}-\beta)}$ at multiplication block 164 to generate the stator reference frame voltage command $\underline{v}^s_{qd}$ imposed to the motor model 110.

The feedback and decoupling portion of the floating synchronous frame controller will now be described in greater detail with reference to FIG. 3. The stator reference frame current Park vector is constructed using at least two machine phase currents and is received by the multiplication block 166, where it is converted into the floating synchronous reference frame by multiplying the stator current vector $i^s_{qd}$ by $e^{-j(\theta_{est}-\beta)}$, where $\theta_{est}$ is the estimated angular position of the current Park vector. The output of the multiplication block 166 is the floating synchronous reference frame current Park vector $\underline{i}_{vu}$.

The floating synchronous reference frame vector current $\underline{i}_{vu}$ is then received by vector block 168 which generates the v-axis and u-axis components of the vector current $\underline{i}_{vu}$. The v-axis current $i_v$ is then received by decoupling term multiplication block 147, and also by adder 140. The u-axis current $i_u$ is received by decoupling term multiplication block 143, and also by adder 150.

The floating synchronous reference frame vector current $\underline{i}_{vu}$ is also received by ANGLE block 106, and the floating reference frame voltage Park vector $\underline{v}_{vu}$ is received by ANGLE block 108, the output of each is then subtracted at adder 104 to provide the actual power factor ((PF)fdbk) input at adder 100. The ANGLE blocks 106 and 108 calculate the angle values of the current Park and voltage Park vectors $\underline{i}_{vu}$ and $\underline{v}_{vu}$, respectively.

The stator current vector $i^s_{qd}$ output of block 118 is also coupled with the vector cross-product block 170 which multiplies the stator current vector $i^s_{qd}$ with the output $e^{j\theta_{est}}$ of block 186. The stationary reference frame vector current signal is then compared to zero at adder 172 after the vector-cross multiplication block 170, and the output of adder 172 is received by PI regulator 174. The output of PI regulator 174 is added to an initial angular velocity $\omega_0$ at adder 176 to generate an estimated angular velocity signal $\omega_{est}$.

As shown in greater detail in FIG. 4, the Park vector of the phase current in stationary reference frame $\underline{i}^s_{qd}$ is crossmultiplied by $e^{j\theta_{est}}$ at multiplier 170 and compared with the zero value at adder 172. The resultant value of the sum of the product ($\underline{i}^s_{qd} \times e^{j\theta_{est}}$) and the zero value is fed into PI regulator

174. The output of PI regulator 174 is the angular estimation of the current vector $\omega_{est}$. The position estimation $\theta_{est}$ is then obtained by integrating the angular speed at block 178, and this position information can then be used for the coordinate transformations for the controller.

Returning to FIG. 3, the estimated angular velocity signal $\omega_{est}$ is input to multiplication blocks 143 and 147 to generate the decoupling terms. The estimated angular velocity signal $\omega_{est}$ is also operated upon by the integration function [1/s] of block 178 to generate the position estimate $\theta_{est}$. The position estimate $\theta_{est}$ is received by block 182 after adder 180, which adds a $-\beta$ value to the position estimate $\theta_{est}$, to generate the term $e^{+j(\theta_{est}-\beta)}$ which is input to multiplication block 164 with the floating reference frame voltage Park vector command output of block 162 to convert from the floating synchronous reference frame to the stationary reference frame.

The $\theta_{est}$ is also received by block 184 after adder 180, which adds the $-\beta$ value as noted above, to generate the term $e^{-j(\theta_{est}-\beta)}$ which is input to the multiplication block 166 with the stator current vector $\underline{i}^s_{qd}$ output of block 118 to convert from the stator reference frame to the floating synchronous reference frame, wherein the floating synchronous reference frame is shifted from the estimated angle of the phase current Park vector by angle $\beta$. This can be done using the ($e^{-j(\theta_{est}-\beta)}$ or $\cos(\theta_{est}-\beta)-j\sin(\theta_{est}-\beta)$) values, and the current Park vector ($\underline{i}^s_{qd}=i^s_q - ji^s_d$). The result of the multiplication is a current Park vector in a synchronous frame that may be expressed as in equations (9) and (10):

$$\underline{i}_{vu}=i_v-ji_u=\underline{i}^s_{qd}e^{-j(\theta_{est}-\beta)} \qquad (9)$$

$$\underline{i}_{vu}=(i^s_q\cos(\theta_{est}-\beta)-i^s_d\sin(\theta_{est}-\beta))-j(i^s_d\cos(\theta_{est}-\beta)+i^s_q\sin(\theta_{est}-\beta)) \qquad (10)$$

wherein, $$i_v=i^s_q\cos(\theta_{est}-\beta)-i^s_d\sin(\theta_{est}-\beta)$$

$$i_u=i^s_d\cos(\theta_{est}-\beta)+i^s_q\sin(\theta_{est}-\beta)$$

In accordance with an exemplary system and method as described above, the estimated angular position is then added to the negative of the angle of the current Park vector in floating reference frame. This modified angle is used for transformations from stationary to floating reference frame or vice versa. In this example, the reference frame is moved by the negative of the current angle to achieve the desired power factor.

Initially an arbitrary floating reference frame $e^{j\theta_{est}}$ is assumed and the control loop forces this initial arbitrary $e^{j\theta_{est}}$ position vector to be in-phase with the current vector within a number of update cycles. When this is achieved, the reference system $e^{j\theta_{est}}$ is locked to the current vector and consequently, the quadrature-axis of the current becomes zero. The new floating reference frame is then used for other control loops in the system, such as current control loops for the transformation of variables from synchronous to stationary frame, or vice versa. Such implementations of the controller described above can be achieved by either a hardware or software based scheme.

In the various implementations of the present invention, simulations can be performed using any number of software packages. The decoupling of crosscoupling can also be simulated, including the addition of decoupling of crosscoupling terms, for illustrating the u-axis voltage resulting in a finite angle between the current and voltage vectors.

One of the desired results provided by the implementation of the embodiments of the present invention is the capability to achieve unity power factor with the accurate estimation achieved by the decoupling of crosscoupling concept. Similarly, there are applications where the power factor is preferred as being either lagging or leading.

In the exemplary embodiments of the present invention described above, the sensorless technique successfully adjusts the power factor of the controlled motor drive system which leads to accurate estimation and control. A lagging current can be employed to achieve the use of a reluctance torque component of a salient pole synchronous machine or an internal PM synchronous machine. A leading current can be used for field weakening purposes of a PM machine. The unity power factor can be used in applications where efficiency optimizations are performed. Therefore, the proposed power factor control scheme for sensorless drives achieves these system level requirements with robust position estimation and performance.

The embodiments of the present invention are further applicable for providing an estimation of rotor position for sensorless control for synchronous machines, such as for Starter/Generator and ECS applications. Two potential applications of this system and method include PM Synchronous machines for ECS systems, and salient-pole synchronous machines for main engine Starter/Generator and APU applications. In still other applications, the embodiments of the present invention can be provided with other synchronous machines, such as internal PM machines or synchronous reluctance machines.

While the invention disclosed herein has been described by means of specific embodiments and applications thereof, numerous modifications and variations can be made thereto by those skilled in the art without departing from the scope of the invention as set forth in the following claims.

What is claimed is:

1. A method for actively controlling and changing a power factor during operation of a synchronous machine, the method comprising the steps of:
    generating a floating synchronous reference frame;
    providing an estimated angle of a phase current Park vector; and
    shifting said floating synchronous reference frame from the estimated angle of the phase current Park vector by an angle $\beta$ to provide coordinate transformation for a controller to drive a synchronous machine.

2. A method for actively controlling and changing a power factor as claimed in claim 1, further comprising the step of:
    generating said estimated angle of the phase current Park vector of the motor phase current from a Park vector of motor phase current in stationary reference frame.

3. A method for actively controlling and changing a power factor as claimed in claim 2, further comprising the step of:
    multiplying said floating synchronous reference frame voltage Park vector command by an exponential function of said estimated angle of the phase current Park vector minus said beta angle ($\beta$) to shift said floating reference frame from an estimated angle of a phase current Park vector by said beta angle ($\beta$) to obtain the voltage Park vector command in stator reference frame.

4. A method for actively controlling and changing a power factor as claimed in claim 3, further comprising the step of:
    multiplying said shifted floating reference frame voltage Park vector command by $e^{+j(\theta_{est}-\beta)}$ to generate a stator reference frame voltage command imposed to a motor, wherein $\theta_{est}$ is the estimated angular position of the current Park vector.

5. A method for actively controlling and changing a power factor as claimed in claim 4, wherein said beta angle ($\beta$) is the current Park vector in floating reference frame.

6. A method for actively controlling and changing a power factor as claimed in claim 2, further comprising the step of:

multiplying said stationary reference frame current Park vector feedback by an exponential function of said estimated angle of the phase current Park vector minus said beta angle (β) to shift said stator reference frame from an estimated angle of a phase current Park vector by said beta angle (β) to obtain the current Park vector feedback in floating reference frame.

7. A method for actively controlling and changing a power factor as claimed in claim 6, further comprising the step of:

multiplying said shifted stationary reference frame current Park vector command by $e^{-j(\theta_{est}-\beta)}$ to generate a floating reference frame current feedback used in the controller, wherein $\theta_{est}$ is the estimated angular position of the current Park vector.

8. A method of controlling a power factor at either unity, leading or lagging for the sensorless control of synchronous machines, comprising the steps of:

commanding a desired power factor (PF) of either a leading, lagging or unity value using a negative, positive, or unity command;

comparing said desired power factor (PF) with an actual power factor ((PF)fdbk) at a first adder, said comparison producing a power factor (PF) error value;

operating upon said power factor (PF) error value by a first PI regulator, wherein an output of said first PI regulator is an angle command of a current Park vector in floating reference frame provided to a floating frame controller; and     operating upon said angle command of said current Park vector in floating reference frame by said floating frame controller to provide a stator reference frame voltage command, wherein said stator reference frame voltage command is provided using a position estimate and said floating reference frame is shifted by an angle beta (β).

9. A method of controlling a power factor for the sensorless control of synchronous machines as claimed in claim 8, further comprising the steps of:

decomposing said command of said current Park vector into v- and u-components of said Park vector in floating reference frame;

comparing said v- and u-components of said Park vector in floating reference frame at a second and third adder, respectively, with a corresponding feedback in floating reference frame to generate current errors;

operating upon said current errors by second and third PI regulators, wherein an output of said second and third PI regulators comprises a voltage value; and     summing said outputs of said second and third PI regulators with decoupling of crosscoupling terms to generate decoupled v- and u-voltages.

10. A method of controlling a power factor for the sensorless control of synchronous machines as claimed in claim 9, further comprising the step of:

operating upon said decoupled v- and u-voltages to generate a floating synchronous reference frame voltage Park vector command.

11. A method of controlling a power factor for the sensorless control of synchronous machines as claimed in claim 10, wherein the step of providing said stator reference frame voltage command further comprises the step of:

multiplying said floating synchronous reference frame voltage Park vector command by said angular position estimate of the current vector minus said beta angle (β) to shift said floating reference frame from an estimated angle of a phase current Park vector by said beta angle (β).

12. A method of controlling a power factor for the sensorless control of synchronous machines as claimed in claim 9, further comprising the steps of:

crossmultiplying the Park vector of motor phase current in stationary reference frame by $e^{j\theta_{est}}$ and comparing the product with a zero value at a fourth adder to produce a cross product error value; and     operating upon said cross product error value by a fourth PI regulator, wherein an output of said fourth PI regulator is an angular velocity estimation of a current Park vector.

13. A method of controlling a power factor for the sensorless control of synchronous machines as claimed in claim 12, further comprising the step of:

adding said angular velocity estimation to an initial angular velocity $\omega_0$ at a fifth adder to generate an estimated angular velocity signal $\omega_{est}$.

14. A method of controlling a power factor for the sensorless control of synchronous machines as claimed in claim 13, further comprising the step of:

integrating said estimated angular velocity signal $\omega_{est}$ for generating said position estimate of the current Park vector and establishing a floating reference frame by shifting the estimated angle of the stationary reference frame Park vector by the angle command of the current Park vector in the floating reference frame.

15. A method of controlling a power factor for the sensorless control of synchronous machines as claimed in claim 8, wherein said step of generating said stator reference voltage command using said position estimate further comprises the steps of:

measuring at least two motor phase currents;

determining a stationary reference frame current Park vector based on said motor phase currents;

estimating an angular velocity of the stationary reference frame current Park vector;

estimating an angle of the stationary reference frame current Park vector;

establishing a floating reference frame by shifting the estimated angle of the stationary reference frame Park vector by the angle command of the current Park vector in the floating reference frame, wherein the floating reference frame is shifted from the estimated angle of the phase current Park vector by the angle beta (β);

transforming the stationary reference frame current Park vector into a floating reference frame current Park vector; and     generating a decoupled voltage command based on the floating reference frame current Park vector and said estimated angular velocity.

16. A method of controlling a power factor for the sensorless control of synchronous machines as claimed in claim 12, wherein said step of generating said stator reference frame voltage Park vector command using said position estimate comprises the steps of:

delivering an initial voltage command to said motor;

measuring at least two phase currents in said motor;

constructing a stationary reference frame current Park vector based on said phase currents;

transforming said stationary reference frame current Park vector into a floating reference frame current Park vector;

comparing a u-axis component of said floating reference frame current Park vector to a predetermined value;

using a PI regulator to drive said u-axis current towards said predetermined value;

forcing said output to be zero if an output of said fourth PI (174) regulator is negative;

adding an initial low frequency to said output of said fourth PI regulator;

estimating the velocity and angle of the stationary reference frame current Park vector based on the output of said fourth PI regulator; and modifying the voltage command based on the output of said fourth PI regulator.

17. A method of controlling a power factor for the sensorless control of synchronous machines as claimed in claim 16, wherein said predetermined value is zero.

18. An apparatus for controlling a power factor at either unity, leading or lagging for the sensorless control of synchronous machines, comprising:

a first adder for receiving a control command for a desired power factor (PF) of either a leading, lagging or unity value, said first adder further configured for comparing said desired power factor (PF) with an actual power factor ((PF)fdbk), said comparison producing a power factor (PF) error value;

a first PI regulator for operating upon said power factor (PF) error value, wherein an output of said first PI regulator is an angle command of said current Park vector in floating reference frame provided to a floating frame controller; and a floating frame controller for operating upon said angle command of said current Park vector in floating reference frame to provide a stator reference frame voltage command, wherein said stator reference frame voltage command is provided using a position estimate and said floating reference frame is shifted by an angle beta ($\beta$).

19. An apparatus for controlling a power factor for the sensorless control of synchronous machines as claimed in claim 18, wherein said apparatus further comprises:

a second and third adder for comparing said current Park vector in floating reference frame with a corresponding feedback in floating reference frame to generate current errors, wherein said current Park vector is decomposed into v- and u-components of said Park vector in floating reference frame;

second and third PI regulators for operating upon said current errors, wherein an output of said second and third PI regulators comprises a voltage value; and a summer for summing said outputs of said second and third PI regulators with decoupling of crosscoupling terms to generate decoupled v- and u-voltages.

20. An apparatus for controlling a power factor for the sensorless control of synchronous machines as claimed in claim 19, wherein said apparatus further comprises:

a function block for operating upon said decoupled v- and u-voltages to generate a floating synchronous reference frame voltage Park vector command;

a multiplier for crossmultiplying said floating synchronous reference frame voltage Park vector command by said angular position estimate of the current vector minus said beta angle ($\beta$) to shift said floating reference frame from an estimated angle of a phase current Park vector by said beta angle ($\beta$) to generate said stator reference frame voltage command;

a multiplier for crossmultiplying at least one Park vector of a motor phase current in stationary reference frame by $e^{j\theta_{est}}$;

a fourth adder for comparing the product with a zero value to produce a cross product error value;

a fourth PI regulator for operating upon said cross product error value, wherein an output of said fourth PI regulator is an angular estimation of a current vector; and a fifth adder for adding said angular estimation to an initial angular velocity $\omega_0$ to generate an estimated angular velocity signal $\omega_{est}$.

* * * * *